E. WEIKERT.
WEEDING TOOL.
APPLICATION FILED JULY 5, 1912.
1,056,614.
Patented Mar. 18, 1913.
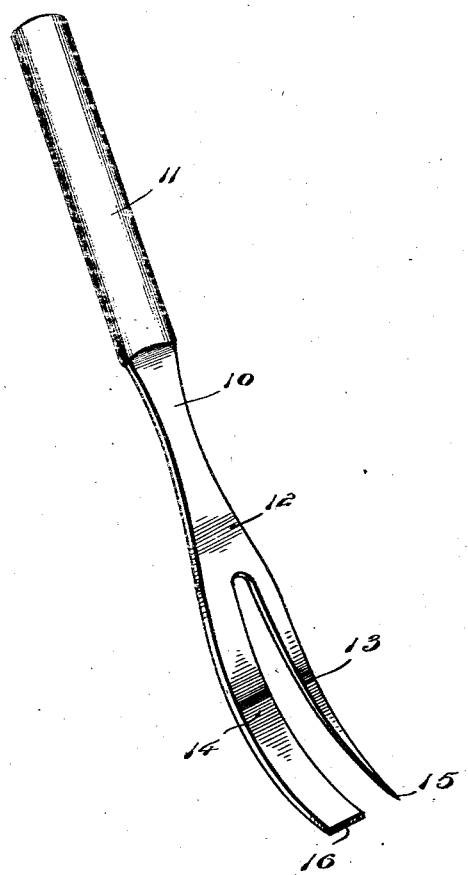
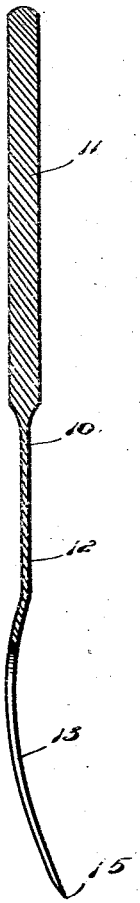
Witnesses
Inventor
Elizabeth Weikert.
By Victor J. Evans
Attorney

UNITED STATES PATENT OFFICE.

ELIZABETH WEIKERT, OF WINSTON, MONTANA.

WEEDING-TOOL.

1,056,614. Specification of Letters Patent. Patented Mar. 18, 1913.

Application filed July 5, 1912. Serial No. 707,846.

*To all whom it may concern:*

Be it known that I, ELIZABETH WEIKERT, a citizen of the United States, residing at Winston, in the county of Broadwater and State of Montana, have invented new and useful Improvements in Weeding-Tools, of which the following is a specification.

This invention relates to gardening and has for an object to provide a weeding tool for removing weeds and other foreign matter from the soil adjacent plants and the roots thereof.

The invention embodies, among other features, a device comprising a body having a handle and terminating in prongs, the said prongs being adapted for insertion in the soil to engage a weed or other foreign matter, after which a twist is imparted to the tool to remove the weed from the soil without injuring the plant adjacent which the weed had sprouted.

In the further disclosure of the invention reference is to be had to the accompanying drawings constituting a part of this specification in which similar characters of reference denote corresponding parts in all the views, and in which:

Figure 1 is a perspective view of the device; and Fig. 2 is a vertical longitudinal sectional view.

Referring more particularly to the views, I provide a body 10, preferably made of an integral piece of material, one end of the body 10 being enlarged to form a handle 11, the other end of the body 10 being flattened to form a shank 12 terminating in spaced prongs 13 and 14, the prong 13 being tapered to a point 15 and the prong 14 terminating in a flat edge 16, the prong 14 being greater in cross sectional area than the prong 13, the mentioned prongs being slightly curved toward one side of the shank 12, as shown.

In the use of the device, the operator grips the handle 11 with the thumb of the hand extending over the shank 12 and the prongs 13 and 14 are then inserted in the soil adjacent the weed that is to be removed, after which a twist is imparted to the tool to sever the weed from the soil, and entirely remove the weed therefrom when an upward pull is exerted on the tool, the pointed prong 13 acting as a pivot or fulcrum for the tool, and upon which the prong 14 is adapted to turn when the tool is twisted.

My device is particularly adaptable for removing weeds and other foreign matter around and adjacent to tender plants and the roots thereof and whereby the weeds or other foreign matter may be removed from close proximity to the plant without injuring the roots of the plant or the body thereof.

Having thus described my invention, I claim:

A weeding tool comprising a single piece of material having one end thereof enlarged to form a handle, the said piece of material adjacent the inner end of the said handle being reduced to form a shank terminating in spaced prongs, bent to one side of the shank, one of the said prongs being pointed and the other of the said prongs being provided with a flattened edge.

In testimony whereof I affix my signature in presence of two witnesses.

ELIZABETH WEIKERT.

Witnesses:
 A. P. MOODY,
 ANDREW J. WEIKERT.